US012608078B2

(12) United States Patent
Kim et al.

(10) Patent No.: US 12,608,078 B2
(45) Date of Patent: Apr. 21, 2026

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventors: Nam Kim, Seoul (KR); You Keun Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 603 days.

(21) Appl. No.: 17/837,606

(22) Filed: Jun. 10, 2022

(65) Prior Publication Data

US 2022/0413604 A1 Dec. 29, 2022

(30) Foreign Application Priority Data

Jun. 24, 2021 (KR) ........................ 10-2021-0082303

(51) Int. Cl.
*G06F 3/01* (2006.01)
*B60R 1/22* (2022.01)
(Continued)

(52) U.S. Cl.
CPC ................ *G06F 3/013* (2013.01); *B60R 1/22* (2022.01); *G01C 21/3626* (2013.01); *G06T 7/70* (2017.01);
(Continued)

(58) Field of Classification Search
CPC ..... G06F 3/013; B60R 1/22; B60R 2300/101; B60R 2300/20; B60R 2300/404;
(Continued)

(56) References Cited

U.S. PATENT DOCUMENTS 10,394,318 B2 * 8/2019 Kruglick .................. G06T 7/74
2014/0129082 A1 * 5/2014 Takahashi ............ B60R 16/027
701/36

(Continued)

FOREIGN PATENT DOCUMENTS

JP 2019-098857 A 6/2019
JP 2023012821 A * 1/2023 ........... H04N 23/951
(Continued)

OTHER PUBLICATIONS

English Translation of Foreign application priority data JP 2021-116532 of JP2023012821A (Year: 2011).*
(Continued)

*Primary Examiner* — Kyu Chae
(74) *Attorney, Agent, or Firm* — Morgan, Lewis & Bockius LLP

(57) ABSTRACT

A vehicle includes a driver sensor provided inside the vehicle and configured to obtain a face image of a driver; a side camera configured to obtain images of a rear left side and a rear right side of the vehicle; a display configured to output the images of the rear left side and the rear right side of the vehicle; and a controller electrically connected to the driver sensor, the side camera, and the display; wherein the controller is configured to identify a gaze direction of the driver based on the face image of the driver, and adjust at least one of a frame rate of the side camera or a screen brightness of the display based on the gaze direction of the driver.

18 Claims, 7 Drawing Sheets

(51) Int. Cl.

| | |
|---|---|
| *G01C 21/36* | (2006.01) |
| *G06T 7/70* | (2017.01) |
| *G06V 20/58* | (2022.01) |
| *G06V 20/59* | (2022.01) |
| *H04N 7/18* | (2006.01) |
| *H04N 23/611* | (2023.01) |

(52) U.S. Cl.

CPC ............ *G06V 20/58* (2022.01); *G06V 20/597* (2022.01); *H04N 7/18* (2013.01); *H04N 23/611* (2023.01); *B60R 2300/101* (2013.01); *B60R 2300/20* (2013.01); *G06T 2207/30201* (2013.01); *G06T 2207/30252* (2013.01); *G06T 2207/30268* (2013.01)

(58) Field of Classification Search

CPC ..... B60R 2300/8066; B60R 1/00; B60R 1/06; B60R 2001/1253; B60R 1/12; B60R 1/25; B60R 1/26; B60R 2300/105; B60R 2300/802; B60R 21/0134; G01C 21/3626; G06T 7/70; G06T 2207/30201; G06T 2207/30252; G06T 2207/30268; G06V 20/58; G06V 20/597; G06V 40/23; G06V 40/16; H04N 7/18; H04N 23/611; H04N 23/73; H04N 23/951; H04N 7/181; G09G 2320/0261; G09G 2320/0626; G09G 2340/0435; G09G 2354/00; G09G 5/10; G02B 27/0093; B60W 50/14; B60W 40/02; B60W 40/08; B60W 2050/146; B60W 2420/403; B60W 2540/225; B60W 2540/30; B60W 2556/50; B60K 35/00; B60K 35/654; B60K 2360/21; B60K 2360/349; B60K 35/20; B60K 35/22; B60Q 1/343

See application file for complete search history.

(56) References Cited

U.S. PATENT DOCUMENTS

| | | | | |
|---|---|---|---|---|
| 2017/0263192 A1* | 9/2017 | Luna | ...................... | G09G 5/003 |
| 2020/0152203 A1* | 5/2020 | Sugihara | ................. | G10L 15/24 |
| 2020/0238826 A1* | 7/2020 | Mizobata | ............. | B60K 35/235 |
| 2023/0027809 A1* | 1/2023 | Akatsuka | ............. | G05D 1/0016 |

FOREIGN PATENT DOCUMENTS

| | | |
|---|---|---|
| KR | 10-1816423 B1 | 1/2018 |
| KR | 10-2019-0078553 A | 7/2019 |

OTHER PUBLICATIONS

Office Action dated Mar. 20, 2026, issued for the corresponding Korean patent application KR 10-2021-0082303.

* cited by examiner

OBTAIN FACE IMAGE OF DRIVER ~401

OBTAIN IMAGES OF A REAR LEFT SIDE AND A REAR RIGHT SIDE OF VEHICLE ~402

OUTPUT IMAGES OF THE REAR LEFT SIDE AND THE REAR RIGHT SIDE OF VEHICLE ON DISPLAY ~403

IDENTIFY DRIVER'S GAZE DIRECTION BASED ON FACE IMAGE OF DRIVER ~404

ADJUST FRAME RATE OF SIDE CAMERA AND/OR SCREEN BRIGHTNESS OF DISPLAY BASED ON DRIVER'S GAZE DIRECTION ~405

FIG. 7

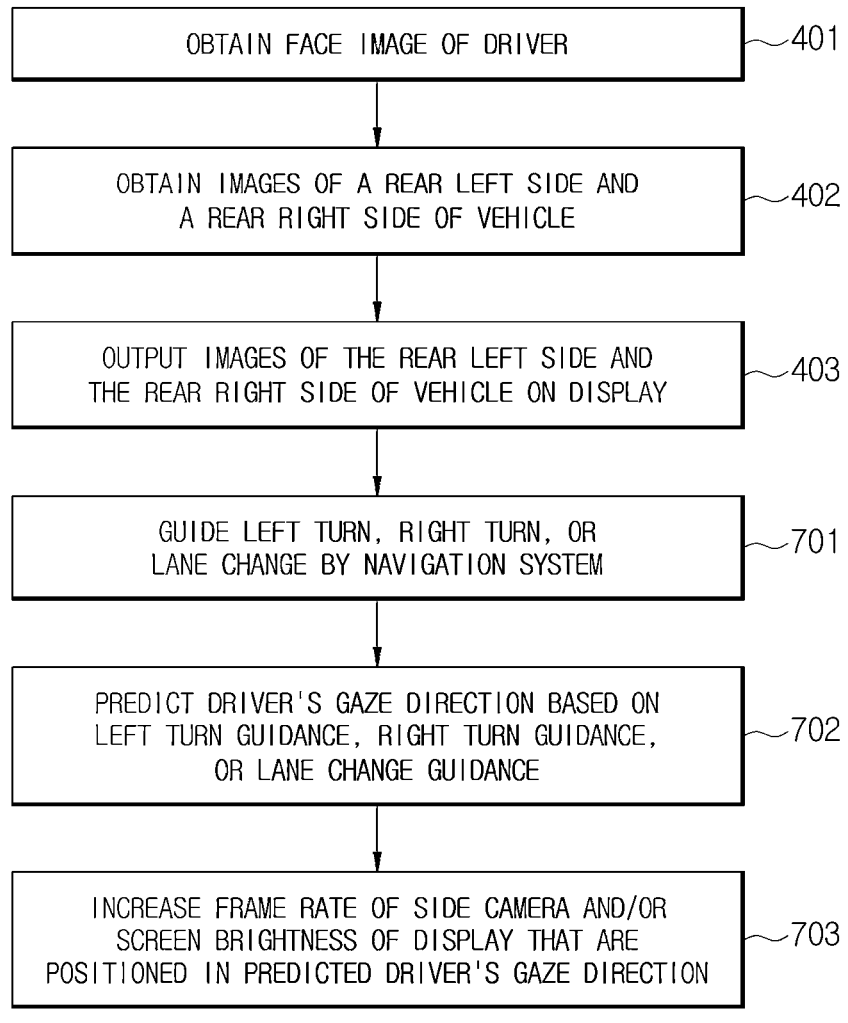

OBTAIN FACE IMAGE OF DRIVER — 401

OBTAIN IMAGES OF A REAR LEFT SIDE AND
A REAR RIGHT SIDE OF VEHICLE — 402

OUTPUT IMAGES OF THE REAR LEFT SIDE AND
THE REAR RIGHT SIDE OF VEHICLE ON DISPLAY — 403

GUIDE LEFT TURN, RIGHT TURN, OR
LANE CHANGE BY NAVIGATION SYSTEM — 701

PREDICT DRIVER'S GAZE DIRECTION BASED ON
LEFT TURN GUIDANCE, RIGHT TURN GUIDANCE,
OR LANE CHANGE GUIDANCE — 702

INCREASE FRAME RATE OF SIDE CAMERA AND/OR
SCREEN BRIGHTNESS OF DISPLAY THAT ARE
POSITIONED IN PREDICTED DRIVER'S GAZE DIRECTION — 703

VEHICLE AND METHOD OF CONTROLLING THE SAME

CROSS-REFERENCE TO RELATED APPLICATION(S)

This application claims the benefit of priority to Korean Patent Application No. 10-2021-0082303, filed on Jun. 24, 2021, the disclosure of which is incorporated herein by reference.

TECHNICAL FIELD

The disclosure relates to a vehicle including a digital side mirror and a method of controlling the same.

BACKGROUND

In general, vehicles have side mirrors on their doors. The side mirrors protrude from an outer surface of the door by a predetermined length, and provide a driver with a rear view, a rear left view, and a rear right view of the vehicle. A conventional side mirrors include a plate part formed of a glass material.

Recently, digital side mirrors including cameras have been developed and applied to a vehicle. The digital side mirrors may include the cameras provided on an outer surface of the door and a display provided inside the vehicle. The cameras capture rear left side and rear right side of the vehicle, and an image of the rear left and right sides captured by the cameras is output through the display.

Digital side mirrors are powered by a vehicle's battery and continuously consume power while the vehicle is operating. However, when the digital side mirrors are always operating at peak performance, power consumption may increase and an amount of charge of a battery may decrease relatively quickly. Furthermore, a driving distance of the vehicle may be shortened due to the power consumption of the digital side mirrors.

SUMMARY

An aspect of the disclosure is to provide a vehicle capable of reducing power consumption by controlling an operation of a side camera and a display, which are constituting digital side mirrors, and a method of controlling the same.

Additional aspects of the disclosure will be set forth in part in the description which follows and, in part, will be obvious from the description, or may be learned by practice of the disclosure.

According to an aspect of the disclosure, a vehicle includes a driver sensor disposed inside the vehicle and configured to obtain a face image of a driver; a side camera configured to obtain images of a rear left side and a rear right side of the vehicle; a display configured to output the images of the rear left side and the rear right side of the vehicle; and a controller electrically connected to the driver sensor, the side camera, and the display; wherein the controller is configured to identify a gaze direction of the driver based on the face image of the driver, and adjust at least one of a frame rate of the side camera and a screen brightness of the display based on the gaze direction of the driver.

The controller may increase the at least one of the frame rate of the side camera or the screen brightness of the display based on the gaze direction of the driver toward the display, and decrease the at least one of the frame rate of the side camera or the screen brightness of the display based on the gaze direction of the driver deviating from the display.

The controller may increase the at least one of the frame rate of the side camera or the screen brightness of the display based on an identification of an object located on at least one of the rear left side or the rear right side of the vehicle in a state in which the gaze direction of the driver is out of the display.

The controller may identify the object located on at least one of the rear left side or the rear right side of the vehicle based on the images of the rear left side and the rear right side obtained by the side camera.

The vehicle may further include a sensor disposed on a rear of the vehicle and configured to obtain object data; wherein the controller is further configured to identify the object based on the object data obtained by the sensor.

The vehicle may further include a memory configured to store driver's behavior pattern data associated with the gaze direction of the driver; wherein the controller is further configured to predict the gaze direction of the driver caused by a driver's behavior based on the driver's behavior pattern data, and increase the at least one of the frame rate of the side camera positioned in the predicted gaze direction of the driver or the screen brightness of the display positioned in the predicted gaze direction of the driver.

The controller may predict the gaze direction of the driver based on at least one of rotation of a steering device or flashing of a turn indicator lamp.

The vehicle may further include a navigation system configured to guide a driving route to a destination set by the driver; wherein the controller is further configured to predict the gaze direction of the driver based on a left turn guidance, a right turn guidance, or a lane change guidance by the navigation system, and increase in advance the at least one of the frame rate of the side camera positioned in the predicted gaze direction of the driver or the screen brightness of the display positioned in the predicted gaze direction of the driver.

The controller may determine at least one of an adjustment value of the frame rate of the side camera or an adjustment value of the screen brightness of the display based on a predetermined sensitivity of the driver.

The side camera may include a first side camera disposed on a door of the driver side and a second side camera disposed on a door of a front passenger side.

The display may include a first display disposed on a driver seat side and a second display disposed on a front passenger seat side.

According to another aspect of the disclosure, a method of controlling a vehicle, the method comprising obtaining, by a driver sensor disposed inside the vehicle, a face image of a driver; obtaining, by a side camera, images of a rear left side and a rear right side of the vehicle; displaying, by a display, the images of the rear left side and the rear right side of the vehicle; identify, by a controller, a gaze direction of the driver based on the face image of the driver; and adjusting, by the controller, at least one of a frame rate of the side camera or a screen brightness of the display based on the gaze direction of the driver.

The adjusting may include increasing, by the controller, the at least one of the frame rate of the side camera and the screen brightness of the display based on the gaze direction of the driver toward the display; and decreasing, by the controller, the at least one of the frame rate of the side camera or the screen brightness of the display based on the gaze direction of the driver deviating from the display.

The adjusting may include increasing, by the controller, the at least one of the frame rate of the side camera or the screen brightness of the display based on an identification of an object located on at least one of the rear left side or the rear right side of the vehicle in a state in which the gaze direction of the driver is out of the display.

The object located on at least one of the rear left side or the rear right side of the vehicle may be identified based on the images of the rear left and right sides obtained by the side camera.

The object located on the rear left and right sides of the vehicle may be identified based on object data obtained by a sensor disposed on a rear of the vehicle.

The adjusting may include predicting, by the controller, the gaze direction of the driver caused by a driver's behavior based on driver's behavior pattern data associated with the gaze direction of the driver, and increasing, by the controller, the at least one of the frame rate of the side camera positioned in the predicted gaze direction of the driver or the screen brightness of the display positioned in the predicted gaze direction of the driver.

The predicting may be based on at least one of turning of a steering device and flashing a turn indicator lamp.

The adjusting may include predicting, by the controller, the gaze direction of the driver based on a left turn guidance, a right turn guidance, or a lane change guidance by a navigation system, and increasing, by the controller, in advance the at least one of the frame rate of the side camera positioned in the predicted gaze direction of the driver or the screen brightness of the display positioned in the predicted gaze direction of the driver.

The adjusting may include determining, by the controller, at least one of an adjustment value of the frame rate of the side camera or an adjustment value of the screen brightness of the display based on a predetermined sensitivity of the driver.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 7 is a flowchart illustrating a method of controlling a vehicle interworked with guidance of a navigation system as a partially modified example of the method of controlling the vehicle illustrated in FIG. 4.

DETAILED DESCRIPTION

Figure 1:
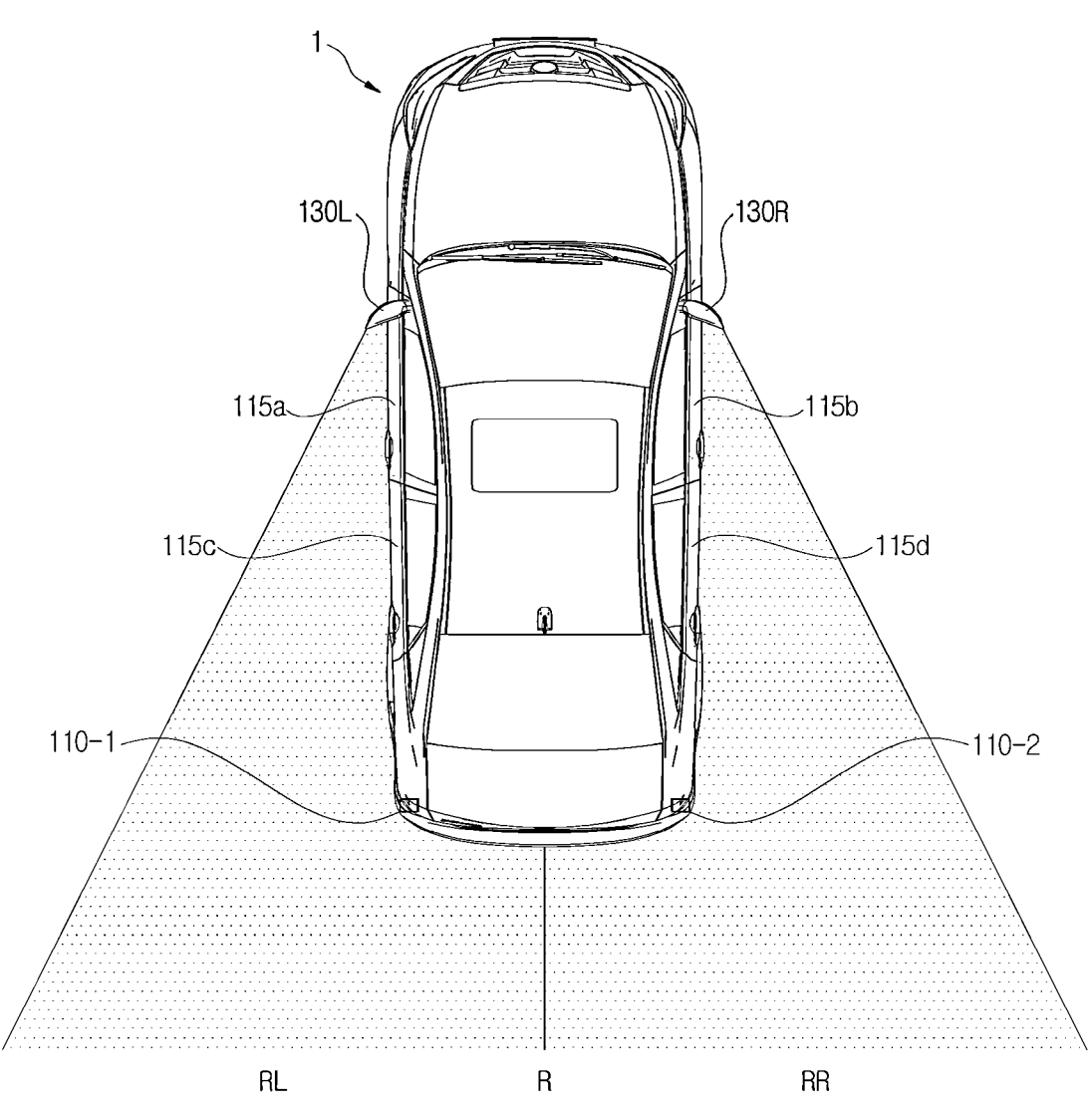
FIG. 1 is a view illustrating an exterior of a vehicle according to an exemplary embodiment of the disclosure.

Like numerals refer to like elements throughout the specification. Not all elements of embodiment of the disclosures of the disclosure will be described, and description of what are commonly known in the art or what overlap each other in the embodiment of the disclosures will be omitted.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Further, when it is stated that a member is "on" another member, the member may be directly on the other member or a third member may be disposed therebetween.

Terms such as "~ unit", "~ group", "~ block", "~ member", and "~ module" used in the specification may be implemented in software and/or hardware. Terms such as "~ unit", "~ group", "~ block", "~ member", and "~ module" may refer to a unit that processes at least one function or operation. In addition, terms such as "~ unit", "~ group", "~ block", "~ member", and "~ module" are used in at least one piece of hardware such as a field-programmable gate array (FPGA)/application specific integrated circuit (ASIC), or at least one software or processor stored in a memory.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, embodiments of the disclosure related to a vehicle and a method of controlling the same will be described in detail with reference to the accompanying drawings.

Figure 2:
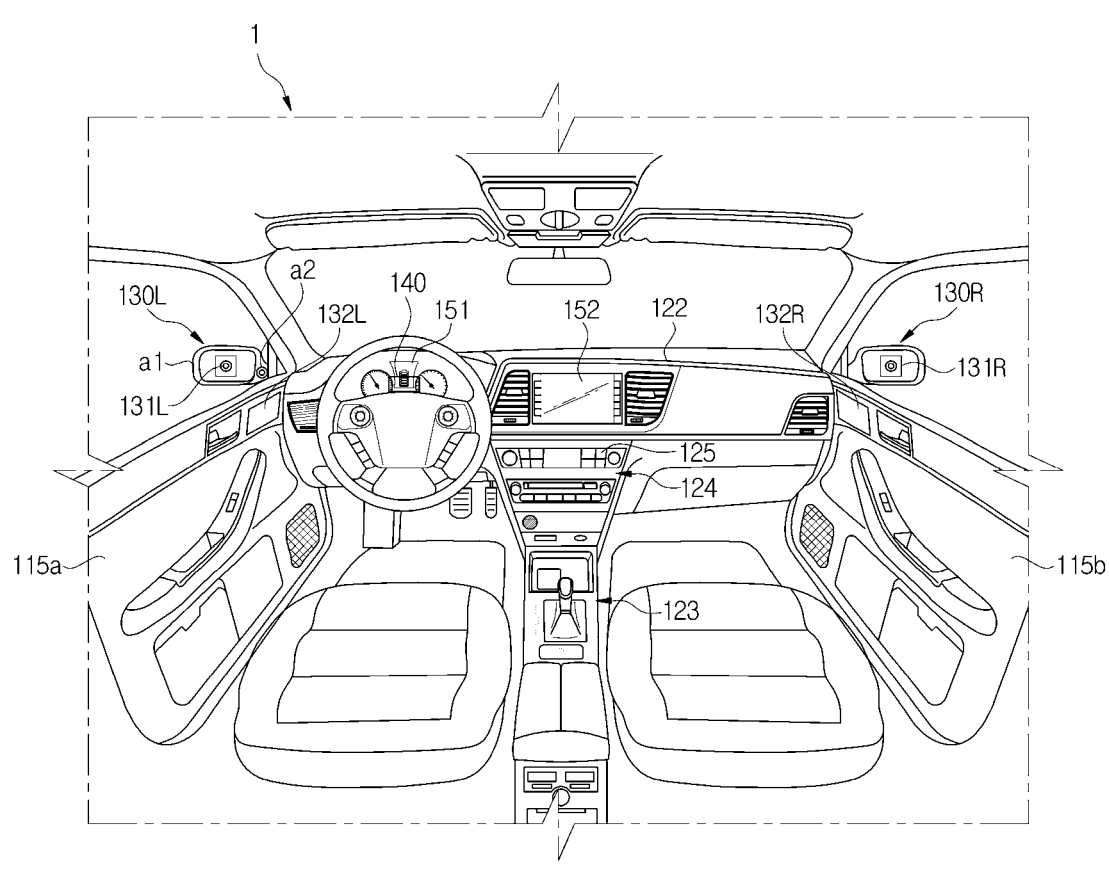
FIG. 2 is a view illustrating an interior of a vehicle according to an embodiment of the disclosure.

FIG. 1 is a view illustrating an exterior of a vehicle according to an exemplary embodiment of the disclosure. FIG. 2 is a view illustrating an interior of a vehicle according to an embodiment of the disclosure.

Referring to FIG. 1, a vehicle 1 includes a body having an exterior and an interior, and a chassis in which mechanical components required for driving are installed as the remaining parts except for the body. The exterior of the body may include a front panel, a roof panel, a rear panel, a plurality of doors 115a, 115b, 115c, and 115d (115), and a plurality of window glasses. The door 115 may be provided with a door locking device for opening and closing.

Furthermore, the vehicle 1 may include a tailgate that opens and closes a trunk that provides a space for storing things, a front light to secure a front view, a rear light to notify deceleration or stop of the vehicle, and a flasher provided at the front and rear of the vehicle to serve as a turn indicator and an emergency light.

Furthermore, the vehicle 1 may include a sensor 110 that detects a surrounding object and digital side mirrors 130L and 130R (130) that provide a driver with a rear view, a rear left side view, and a rear right side view of the vehicle 1.

The sensor 110 may detect an object around the vehicle. The sensor 110 may include an image sensor and/or radar, and may obtain object data such as a type of object (e.g., a surrounding vehicle, a pedestrian, a lane, a road sign, and a traffic light), a location of the object, a speed of the object, and a distance to the object.

At least one sensor 110 may be provided. For example, the sensor 110 may include a first corner sensor 110-1 installed on a rear left side of the vehicle 1 and a second corner sensor 110-2 installed on a rear right side of the vehicle 1. The first corner sensor 110-1 may have a detection view directing toward the rear left of the vehicle 1, and the second corner sensor 110-2 may have a detection view directing toward the rear right of the vehicle 1. Furthermore, the sensor 110 may be installed in each of the front and front corners of the vehicle 1. For example, the sensor 110 may be installed in a front window and/or a bumper of the vehicle 1.

The digital side mirrors 130L and 130R (130) may be provided on the door 115, photograph the rear left and right sides of the vehicle 1 to obtain an image of the rear left and right, and output the image of the rear left and right sides of the vehicle. At least one digital side mirror 130 may be provided. For example, the digital side mirrors 130 include a first digital side mirror 130L installed adjacent to A pillar of the door 115a of driver side and a second digital side mirror 130R installed adjacent to A pillar of the door 115b of (front) passenger side. The first digital side mirror 130L may have a field of view facing a rear left RL, and the second digital side mirror 130R may have a field of view facing a rear right RR.

Referring to FIG. 2, the first digital side mirror 130L may include a first side camera 131L and a first display 132L. The first display 132L may output a rear left image obtained by the first side camera 131L. The first display 132L may be provided on a driver seat side. For example, the first display 132L may be installed inside the door 115a of driver side, a part of a dashboard 122 adjacent to the door 115a of driver side, or inside the A pillar of the door 115a of driver side.

The second digital side mirror 130R may include a second side camera 131R and a second display 132R. The second display 132R may output a rear right image obtained by the second side camera 131R. The second display 132R may be provided on a passenger seat side. For example, the second display 132R may be installed inside the door 115b of the (front) passenger side, a part of the dashboard 122 adjacent to the door 115b of the passenger side, or inside the A pillar of the door 115b of the passenger side.

Furthermore, the digital side mirrors 130L and 130R (130) may include a housing a1 for protecting the side cameras 131L and 131R (131), and a folding part a2 for automatically folding or unfolding the housing a1. For example, when the vehicle 1 is started off or a remote controller such as a smart key moves out of a predetermined distance from the vehicle 1, the housing a1 may be folded toward the door 115 by the folding part a2. Conversely, when the vehicle 1 is started on or the remote controller such as the smart key is located within the predetermined distance from the vehicle 1, the housing a1 may be unfolded in the opposite direction to the folding direction by the folding part a2.

The interior of the vehicle 1 may include a seat, the dashboard 122, a center fascia 123, and a head unit 124. A third display 151 and a fourth display 152 may be provided on the dashboard 122. The third and fourth displays 151 and 152 are illustrated as being separated, but the third and fourth displays 151 and 152 may be integrally formed. Furthermore, the display may be provided at various positions inside the vehicle 1.

The third display 151 may serve as an instrument panel (a cluster). The third display 151 may display vehicle state information and driving information. For example, the third display 151 may display a tachometer, a speedometer, a coolant thermometer, a fuel gauge, a turn indicator, a high beam indicator, a warning lamp, a seat belt warning lamp, an odometer, a tachograph, an gear shift indicator (automatic transmission), a door open warning lamp, engine oil warning light, and low fuel warning light, and the like.

The fourth display 152 may be included in an audio video navigation (AVN) device, and may output various information related to a function, state, and/or operation of the vehicle 1. The fourth display 152 may output a graphic user interface (GUI) including an object (e.g., icon, text, image, etc.) for executing or setting various functions of the vehicle 1. The GUI may interact with user input. The fourth display 152 may output a screen corresponding to an input to the object. For example, the fourth display 152 may display a driving route to a destination set by the driver, and display various graphic user interfaces for guiding the driving route.

Various input devices 125 may be provided in the center fascia 123 and the head unit 124. Furthermore, the input devices may be provided in a steering device (steering wheel), an armrest, a door handle, and seats. The input device 125 may include buttons, dials, and/or touchpads related to various functions of the vehicle 1. For example, the input devices 125 may include a push button, a touch button, a touch pad, a touch screen, a dial, a stick-type operation device, and/or a track ball.

Furthermore, a driver sensor 140 may be provided inside the vehicle 1. The driver sensor 140 may be implemented as a camera as an image sensor. The driver sensor 140 may photograph the driver and obtain a face image of the driver. A location where the driver sensor 140 is installed is not particularly limited. Because the driver mostly looks forward when the vehicle 1 is traveling, the driver sensor 140 is preferably installed at a position in front of the driver. For example, the driver sensor 140 may be installed on the instrument panel (cluster) or on a ceiling above the driver seat.

Furthermore, the vehicle 1 may include an audio device. At least one audio device may be provided, and may be installed inside the dashboard and/or the door. A sound (e.g., a voice, a warning sound) related to the function, state, and/or operation of the vehicle 1 may be output through the audio device. The audio device may include at least one speaker.

Furthermore, the vehicle 1 may include various devices for operating the vehicle 1. For example, the vehicle 1 may include a power generating device, a power transmission device, a driving assistance device, a steering device, a braking device, an accelerator, a suspension device, a transmission device, a fuel device, wheels and/or a battery. In addition, the vehicle 10 may include a plurality of electrical components. For example, the vehicle 10 may include an electromechanical steering system, a body control module, and a driver assistance system, and a navigation system 160.

Electrical components of the vehicle 1 may communicate with each other via a vehicle communication network (NT). For example, the electrical components may transmit and receive data using the NT, such as an Ethernet, a Media Oriented Systems Transport (MOST), a Flexray, a Controller Area Network (CAN) and/or a Local Interconnect Network (LIN).

Figure 3:
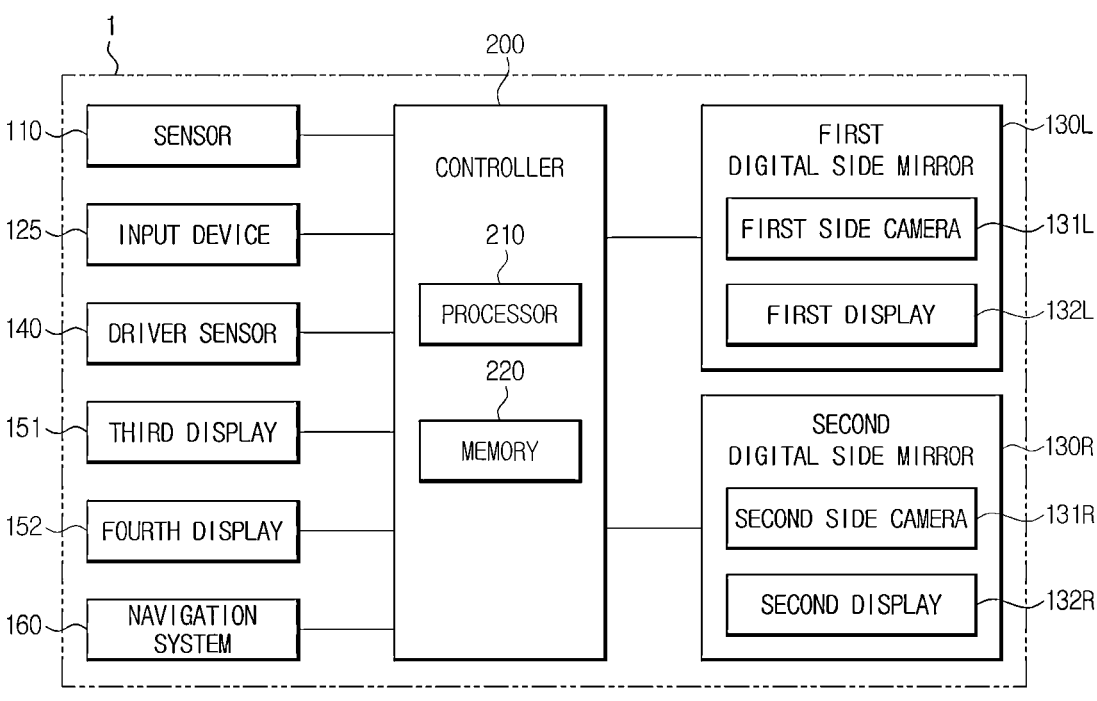
FIG. 3 is a control block diagram illustrating a vehicle according to an exemplary embodiment of the disclosure.

FIG. 3 is a control block diagram illustrating a vehicle according to an exemplary embodiment of the disclosure.

Referring to FIG. 3, the vehicle 1 may include the sensor 110, an input device 125, the first digital side mirror 130L, the second digital side mirror 130R, the driver sensor 140, the third display 151, the fourth display 152, the navigation system 160, and a controller 200. The controller 200 may be electrically connected to devices provided in the vehicle 1 and may control each device.

The sensor 110 may detect the object around the vehicle 1 and obtain object data. For example, the sensor 110 may detect the object located on the rear left and right sides of the vehicle 1, and may obtain the object data such as the type of object, the location of the object, the speed of the object, and the distance to the object. The sensor 110 may transmit the obtained object data to the controller 200.

The input device 125 may obtain a user input. For example, the input device 125 may include a direction indicator lever, and may obtain the user input operating the direction indicator lever to blink the direction indicator lamp. Meanwhile, the steering device (steering wheel) for controlling moving direction of the vehicle 1 may be also defined as included in the input device 125.

The first digital side mirror 130L may include the first side camera 131L and the first display 132L. The first display 132L may output the rear left image obtained by the first side camera 131L. The second digital side mirror 130R may include the second side camera 131R and the second display 132R. The second display 132R may output the rear right image obtained by the second side camera 131R.

The driver sensor 140 may photograph the driver and obtain the face image of the driver. The driver sensor 140 may be implemented as a camera as an image sensor. Furthermore, the driver sensor 140 may include a face analysis device capable of analyzing a user's facial expression and an eye tracker capable of tracking the position of the pupil. The driver sensor 140 may be installed in different positions inside the vehicle 1, but is preferably installed in a position in front of the driver.

The third and fourth displays 151 and 152 may be provided on the dashboard 122. The third and fourth displays 151 and 152 may be provided in a separately or integrally. The third display 151 may serve as the instrument panel (cluster). The fourth display 152 may be included in the AVN device, and may output various information related to the function, state, and/or operation of the vehicle 1.

Each of the first display 132L, the second display 132R, the third display 151, and the fourth display 152 may include a light emitting diode (LED) panel, an organic light emitting diode (OLED) panel, or a liquid crystal display (LCD) panel. Furthermore, the first display 132L, the second display 132R, the third display 151, and the fourth display 152 may include a touch screen.

The navigation system 160 may obtain current location information of the vehicle 1 and guide the driving route from the current location to the destination set by the driver. The driving route set by the navigation system 160 may be guided through the third display 151 and/or the fourth display 152. For example, the navigation system 160 may perform a left turn guidance, a right turn guidance, or a lane change guidance based on the driving route.

The controller 200 may be electrically connected to the electrical devices of the vehicle 1 to control the respective devices. The controller 200 may include a processor 210 and a memory 220. The memory 220 may store a program, an instruction, and/or an application for performing a remote control method of a vehicle. The processor 210 may execute programs, instructions, and/or applications stored in the memory 220. The processor 210 and the memory 220 may be provided in plurality. The controller 200 may include control units such as an Electronic Control Unit (ECU) or a Micro Controller Unit (MCU).

The memory 220 may include a non-volatile memory device such as a cache, a read only memory (ROM), a programmable ROM (PROM), an erasable programmable ROM (EPROM), an electrically erasable programmable ROM (EEPROM), and a flash memory. Furthermore, the memory 220 may include a volatile memory device such as a random access memory (RAM), and may include a storage medium such as a hard disk drive (HDD) or a compact disk ROM (CD-ROM). The type of the memory 220 is not limited to what is illustrated.

In addition to the above-described configurations, the vehicle 1 may include various devices. Furthermore, some of the above-described configurations may be omitted in the vehicle 1. Hereinafter, the method of controlling the vehicle 1 will be specifically described.

Figure 4:
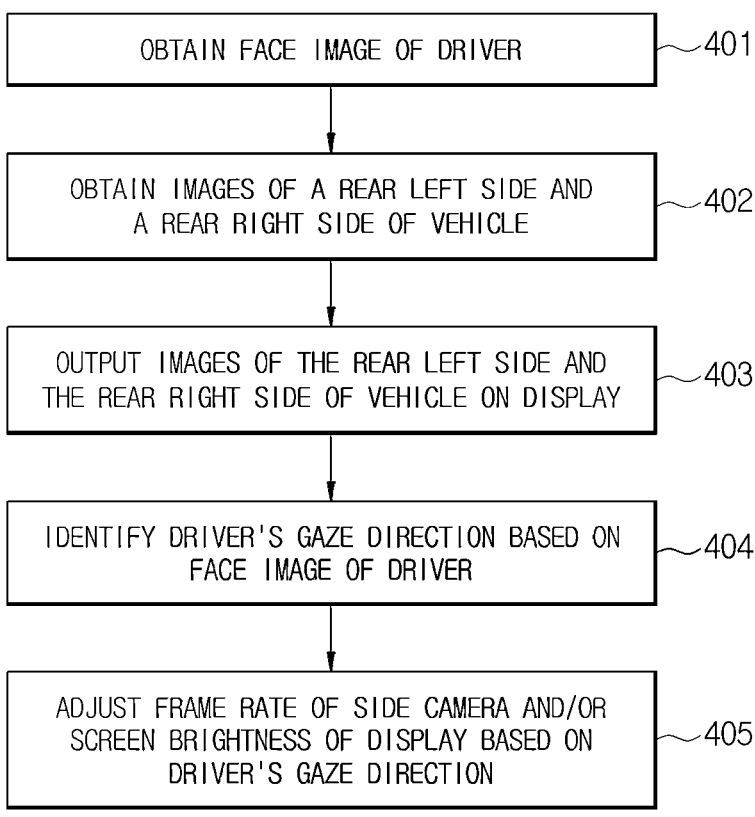
FIG. 4 is a flowchart illustrating a method of controlling a vehicle according to an exemplary embodiment of the disclosure.
Figure 5:
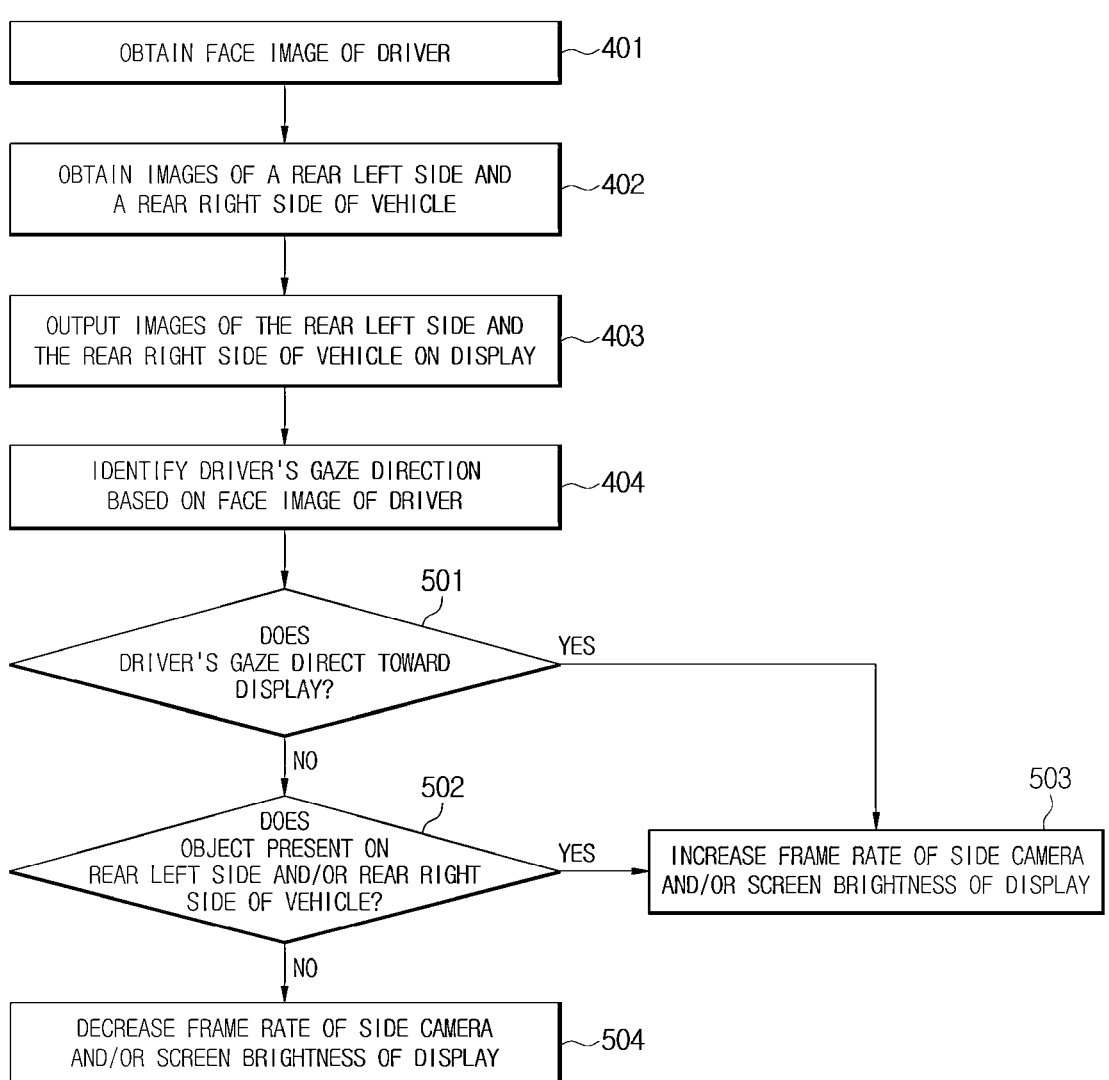
FIG. 5 is a flowchart illustrating in more detail the method of controlling the vehicle illustrated in FIG. 4.

FIG. 4 is a flowchart illustrating a method of controlling a vehicle according to an exemplary embodiment of the disclosure. FIG. 5 is a flowchart illustrating in more detail the method of controlling the vehicle illustrated in FIG. 4.

Referring to FIGS. 4 and 5, the controller 200 of the vehicle 1 may control the driver sensor 140 to obtain the face image of the driver, and receive the face image of the driver from the driver sensor 140 (in operation 401). In addition, the controller 200 may control the at least one side cameras 131L or 131R to obtain the view of rear left and right sides of the vehicle 1 (in operation 402). The controller 200 may control at least one displays 132L or 132R to output the image of the rear left and right sides of the vehicle 1 (in operation 403). For example, the image of the rear left side obtained by the first side camera 131L is output through the first display 132L, and the image of rear right obtained by the second side camera 131R is output through the second display 132R.

The controller 200 may identify a gaze direction of the driver based on the face image of the driver (in operation 404). The face image may include a driver's facial movement and eye movement. The gaze of the driver changes when the driver turns his/her head to look left or right instead of looking straight ahead while driving. Alternatively, the driver may look left or right by moving only their eyes. The controller 200 may identify the direction in which the driver is looking by analyzing the drivers facial movement and eye movement.

The controller 200 may adjust at least one of a frame rate of the side cameras 131L and 131R or a screen brightness of the displays 132L and 132R based on the gaze direction of the driver (in operation 405). The controller 200 may adjust the frame rate of the at least one of the first and second side cameras 131L and 131R, and/or the screen brightness of the at least one of the first and second displays 132L and 132R. For example, the frame rate of the side cameras 131L and 131R may be adjusted between 1 fps (frames per second) and 120 fps. The screen brightness of the displays 132L and 132R may be adjusted from 1 to 100.

As the frame rate of the side cameras 131L and 131R increases, the number of image frames obtained per second increases. When the frame rate of the side cameras 131L and 131R is increased, a high-quality image of the rear left and right sides may be obtained. As the screen brightness of the displays 132L and 132R increases, a visibility of the image of the rear left and right sides increases. Accordingly, in response to the frame rate of the side cameras 131L and 131R increasing and the screen brightness of the displays 132L and 132R increasing, the driver may more clearly see the image of the rear left and right sides output.

Specifically, referring to FIG. 5, the controller 200 may increase at least one of the frame rate of the side cameras 131L and 131R and/or the screen brightness of the displays 132L and 132R based on the gaze direction of the driver directing toward the displays 132L and 132R (in operations 501 and 503). The controller 200 may decrease the frame rate of the side cameras 131L and 131R and/or the screen brightness of the displays 132L and 132R based on the gaze direction of the driver deviating from the displays 132L and 132R. The controller 200 may increase the frame rate of the side cameras 131L and 131R and/or the screen brightness of the displays 132L and 132R based on the identification of the object located on the rear left and right sides of the vehicle 1 in a state where the gaze direction of the driver is out of the displays 132L and 132R (in operations 502 and 504).

The driver needs to look at the first display 132L or the second display 132R to identify the rear left and right sides of the vehicle 1. For example, the driver may look at the first display 132L by turning his/her head to the left or moving the pupil to the left to check the rear left side of the vehicle 1. In this case, by increasing the frame rate of the first side camera 131L positioned in the gaze direction of the driver and simultaneously increasing the screen brightness of the first display 132L positioned in the gaze direction of the driver, the driver may see more clearly the rear left side of the vehicle 1.

It is impossible for the driver to see the second display 132R positioned on the right side of the vehicle 1 while looking at the first display 132L positioned on the left side of the vehicle 1. In other words, when the driver looks at the first display 132L, it is not necessarily required to maintain highly the performance of the second side camera 131R and the performance of the second display 132R. Accordingly, when the driver looks at the first display 132L, decreasing the frame rate of the second side camera 131R and decreasing the screen brightness of the second display 132R helps to reduce power consumption of the battery.

Furthermore, when the gaze direction of the driver moves from the first display 132L to the second display 132R, the controller 200 may decrease the frame rate of the first side camera 131L and decrease the screen brightness of the first display 132L. At the same time, the controller 200 may increase the frame rate of the second side camera 131R and increase the screen brightness of the second display 132R.

However, even if the gaze of direction of the driver is out of the second display 132R, when an object approaching the vehicle 1 is detected from the rear right side of the vehicle 1, a risk of an accident may occur. Accordingly, when an object approaching the vehicle 1 is identified in the image of rear right obtained by the second side camera 131R, the controller 200 may increase the frame rate of the second side camera 131R and increase the screen brightness of the second display 132R so that the driver may clearly see the rear right side of the vehicle 1. The controller 200 may identify an object located on the rear left and right sides of the vehicle 1 based on the image of rear left and right sides obtained by the side cameras 131L and 131R. Furthermore, the controller 200 may identify the object located on the rear left and right sides of the vehicle 1 based on the object data obtained by the sensor 110.

Meanwhile, if the driver is looking at the front (forward) of the vehicle 1, the first and second digital side mirrors 130L and 130R may operate based on a predetermined default setting value. In other words, both the first and second side cameras 131L and 131R may operate at a predetermined default frame rate (e.g., 30 fps), and the first and second displays 132L and 132R may all operate with a predetermined default screen brightness (e.g., 50).

If the gaze direction of the driver faces the first display 132L located on the left, from the front or the right, the controller 200 may set the frame rate of the first side camera 131L to a first frame rate (e.g., 60 fps) higher than the default frame rate, and set the screen brightness of the first display 132L to a first brightness (e.g., 80) higher than the default screen brightness. At the same time, the controller 200 may set the frame rate of the second side camera 131R to the default frame rate or a second frame rate lower than the default frame rate (e.g., 20 fps), and set the screen brightness of the second display 132R to the default screen brightness or a second brightness lower than the default screen brightness (e.g., 40).

Furthermore, the controller 200 may determine at least one of a frame rate adjustment value of the side cameras 131L and 131R or a screen brightness adjustment value of the displays 132L and 132R based on a predetermined driver's sensitivity. The driver may set the sensitivity by manipulating the input device 125. For example, the sensitivity of the driver may be selected as low, medium or high. Based on the gaze direction of the driver, the frame rate of the side cameras 131L and 131R and the screen brightness of the displays 132L and 132R may be changed by the adjustment values, respectively.

The low sensitivity of the driver refers to that the driver is not easily aware of small changes in frame rate and small changes in screen brightness. Accordingly, when the sensitivity of the driver is set to low, the adjustment value of the frame rate and the adjustment value of the screen brightness may be determined to be the largest. Conversely, the high sensitivity of the driver refers to that the driver easily perceives small changes in frame rate and small changes in screen brightness. Accordingly, when the sensitivity of the driver is set to high, the adjustment value of the frame rate and the adjustment value of the screen brightness may be determined to be the smallest. The adjustment value of the frame rate and the adjustment value of the screen brightness corresponding to the sensitivity of the driver may be selected differently depending on the design.

The conventional digital side mirrors may not adaptively adjust the frame rate of the camera and the screen brightness of the display in response to the gaze direction of the driver and a driving situation. In other words, the conventional digital side mirrors operate at a fixed frame rate and fixed brightness unless the driver manually changes the settings of the camera and display. Accordingly, constant power consumption is continuously generated.

However, in method of controlling the vehicle of the disclosure, power consumption may be optimized by automatically adjusting the frame rate of the side camera and the screen brightness of the display based on the gaze direction of the driver. Furthermore, the method of controlling the vehicle of the disclosure may automatically adjust the frame rate of the side camera and the screen brightness of the display in a situation in which the driver is required to look at the digital side mirror. As a result, occurrence of accidents may be reduced and power consumption may be optimized.

Figure 6:
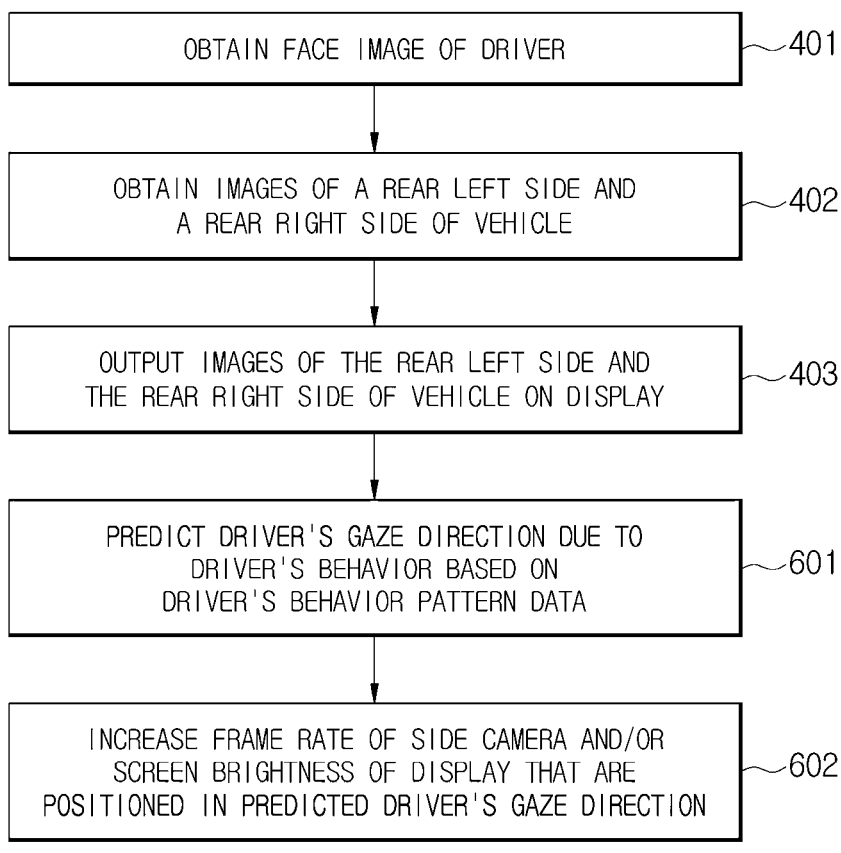
FIG. 6 is a flowchart illustrating a method of controlling a vehicle using a driver's behavior pattern as a partially modified example of the method of controlling the vehicle illustrated in FIG. 4.

FIG. 6 is a flowchart illustrating a method of controlling a vehicle using a driver's behavior pattern as a partial modified example of the method of controlling the vehicle illustrated in FIG. 4.

Referring to FIG. 6, the controller 200 of the vehicle 1 may control the driver sensor 140 to obtain the face image of the driver, and receive the face image of the driver from the driver sensor 140 (in operation 401). Furthermore, the controller 200 may control at least one side camera 131L or 131R to obtain the image of the rear left and right sides of the vehicle 1 (in operation 402). The controller 200 may control at least one display 132L or 132R to output the image of the rear left and right sides of the vehicle 1 (in operation 403).

Furthermore, the memory 220 may store a driver's behavior pattern data related to the gaze direction of the driver. When the vehicle 1 is driving, the driver's gaze is related to the driver's behavior. The controller 200 may control the driver sensor 140 to monitor the driver's behavior. Behavioral pattern data may be continuously updated. The controller 200 may predict the gaze direction of the driver from the driver's behavior based on the driver's behavior pattern data stored in the memory 220 (in operation 601).

For example, the controller 200 may predict the gaze direction of the driver based on at least one of rotation of the steering device (steering wheel) or flashing of the direction indicator. If the driver intends to turn left of the vehicle 1, the driver turns the steering device (steering wheel) to the left. Furthermore, when turning left of the vehicle 1, the driver needs to check that there are no vehicles or other objects approaching the rear left. The driver looks at the first display 132L when the vehicle 1 turns left. As such, the movement of the steering device is related to the movement in the gaze direction of the driver. The controller 200 may predict a leftward movement in the gaze direction of the driver when the steering device rotates even a little to the left. Although it is advantageous for safety to first check the side mirrors before turning the steering system, there may be cases where the driver operates the steering system first.

Furthermore, when the driver intends to turn left of the vehicle 1, the driver may operate the turn indicator lever so that the turn indicator lamp instructing the left movement flashes. The driver moves his/her gaze to the side mirror to check the rear left and right sides corresponding to the direction he wants to move together with the manipulation of the direction indicator lever. As such, the flashing of the turn indicator is associated with the movement of the gaze direction of the driver. In response to flashing of the left turn indicator or the right turn indicator, the controller 200 may predict the movement in the gaze direction of the driver in a direction corresponding to the flashing turn indicator.

Although the left movement in the gaze direction of the driver has been described as an example in the above, the right movement in the gaze direction of the driver may also be predicted based on the driver's behavior.

The controller 200 may increase at least one of the frame rate of the side cameras 131L and 131R (131) positioned in the predicted gaze direction of the driver or the screen brightness of the displays 132L and 132R (132) positioned in the predicted gaze direction of the driver (in operation 602). When the predicted gaze direction of the driver is a left direction, the frame rate of the first side camera 131L and the screen brightness of the first display 132L increase. When the predicted driving gaze direction is a right direction, the frame rate of the second side camera 131R and the screen brightness of the second display 132R increase.

On the other hand, because the driver's behavior related to the gaze direction of the driver has a higher correlation with a change of the traveling position, higher attention to the rear left and right sides of the vehicle 1 may be required. Accordingly, in response to the driver's behavior related to the gaze direction of the driver being detected, the controller 200 may set the frame rate of the side camera 131 positioned in the gaze direction of the driver and the screen brightness of the display 132 to the maximum.

FIG. 7 is a partial modified example of the method of controlling the vehicle described in FIG. 4, and is a flowchart illustrating a method of controlling a vehicle linked with a guidance of a navigation system.

Referring to FIG. 7, the controller 200 of the vehicle 1 may control the driver sensor 140 to obtain the face image of the driver, and receive the face image of the driver from the driver sensor 140 (in operation 401). Furthermore, the controller 200 may control the at least one side camera 131L or 131R to obtain the image of the rear left and right sides of the vehicle 1 (in operation 402). The controller 200 may control the at least one display 132L or 132R to output the image of the rear left and right sides of the vehicle 1 (in operation 403).

The navigation system 160 may guide the driving route to the destination set by the driver. The navigation system 160 may perform a left turn guidance, a right turn guidance, or a lane change guidance based on the driving route (in operation 701). The controller 200 may predict the gaze direction of the driver based on the left turn guidance, the right turn guidance, or the lane change guidance by the navigation system 160 (in operation 702). The left movement in the gaze direction of the driver corresponding to the left turn guidance may be expected, and the right movement in the gaze direction of the driver corresponding to the right turn guidance may be expected. Furthermore, the left movement in the gaze direction of the driver corresponding to the left lane change guidance may be expected, and the right movement in the gaze direction of the driver corresponding to the right lane change guidance may be expected.

The controller 200 may increase in advance the at least one of the frame rates of the side cameras 131L and 131R (131) positioned in the predicted gaze direction of the driver or the screen brightness of the displays 132L and 132R (132) positioned in the predicted gaze direction of the driver (in operation 703).

As is apparent from the above, the vehicle and the method of controlling the same of the disclosure may reduce power consumption by controlling the operation of the side camera and the display constituting the digital side mirrors.

The vehicle and the method of controlling the same of the disclosure may optimize power consumption by automatically adjusting the frame rate of the side camera and the screen brightness of the display based on the gaze direction of the driver.

Furthermore, the vehicle and the method of controlling the same of the disclosure may automatically adjust the frame rate of the side camera and the screen brightness of the display in a situation in which the driver is required to look at the digital side mirrors. Therefore, accidents may be reduced and power consumption may be optimized.

On the other hand, exemplary embodiment of the disclosures of the disclosure have thus far been described with reference to the accompanying drawings. It should be apparent to those of ordinary skill in the art that the disclosure may be practiced in other forms than the exemplary embodiment of the disclosures as described above without changing the technical idea or essential features of the disclosure. The above exemplary embodiment of the disclosures are only by way of example, and should not be interpreted in a limited sense.

What is claimed is:

1. A vehicle, comprising:
a driver sensor disposed inside the vehicle and configured to obtain a face image of a driver;
a side camera configured to obtain images of a rear left side and a rear right side of the vehicle;
a display configured to output the images of the rear left side and the rear right side of the vehicle; and
a controller electrically connected to the driver sensor, the side camera, and the display,
wherein the controller is configured to:
identify a gaze direction of the driver based on the face image of the driver, and
adjust a frame rate of the side camera based on the gaze direction of the driver,
wherein the controller is configured to:
increase the frame rate of the side camera based on the gaze direction of the driver toward the display, and
decrease the frame rate of the side camera based on the gaze direction of the driver deviating from the display.

2. The vehicle of claim 1, wherein the controller is configured to increase the frame rate of the side camera based on an identification of an object located on at least one of the rear left side or the rear right side of the vehicle in a state in which the gaze direction of the driver is out of the display.

3. The vehicle of claim 2, wherein the controller is further configured to identify the object located on at least one of the rear left side or the rear right side of the vehicle based on the images of the rear left side and the rear right side obtained by the side camera.

4. The vehicle of claim 2, further comprising a sensor disposed on a rear of the vehicle and configured to obtain object data,
wherein the controller is further configured to identify the object based on the object data obtained by the sensor.

5. The vehicle of claim 1, further comprising a memory configured to store driver's behavior pattern data associated with the gaze direction of the driver;
wherein the controller in further configured to:
predict the gaze direction of the driver caused by a driver's behavior based on the driver's behavior pattern data, and
increase the frame rate of the side camera positioned in the predicted gaze direction of the driver.

6. The vehicle of claim 5, wherein the controller is configured to predict the gaze direction of the driver based on at least one of rotation of a steering device or flashing of a turn indicator lamp.

7. The vehicle of claim 1, further comprising a navigation system configured to guide a driving route to a destination set by the driver;
wherein the controller is further configured to:
predict the gaze direction of the driver based on a left turn guidance, a right turn guidance, or a lane change guidance by the navigation system, and
increase in advance the frame rate of the side camera positioned in the predicted gaze direction of the driver.

8. The vehicle of claim 1, wherein the controller is further configured to adjust a screen brightness of the display based on the gaze direction of the driver.

9. The vehicle of claim 1, wherein the side camera comprises a first side camera disposed on a door of a driver side and a second side camera disposed on a door of a front passenger side.

10. The vehicle of claim 1, wherein the display comprises a first display disposed on a driver seat side and a second display disposed on a front passenger seat side.

11. A method of controlling a vehicle, the method comprising:
obtaining, by a driver sensor disposed inside the vehicle, a face image of a driver;
obtaining, by a side camera, images of a rear left side and a rear right side of the vehicle;
displaying, by a display, the images of the rear left side and the rear right side of the vehicle;
identify, by a controller, a gaze direction of the driver based on the face image of the driver; and
adjusting, by the controller, a frame rate of the side camera based on the gaze direction of the driver,
wherein the adjusting comprises:
increasing, by the controller, the frame rate of the side camera based on the gaze direction of the driver toward the display; and
decreasing, by the controller, the frame rate of the side camera based on the gaze direction of the driver deviating from the display.

12. The method of claim 11, wherein the adjusting comprises:
increasing, by the controller, the frame rate of the side camera based on an identification of an object located on at least one of the rear left side or the rear right side of the vehicle in a state in which the gaze direction of the driver is out of the display.

13. The method of claim 12, wherein the object located on at least one of the rear left side or the rear right side of the vehicle is identified based on the images of the rear left and right sides obtained by the side camera.

14. The method of claim 12, wherein the object located on the rear left and right sides of the vehicle is identified based on object data obtained by a sensor disposed on a rear of the vehicle.

15. The method of claim 11, wherein the adjusting further comprises:
predicting, by the controller, the gaze direction of the driver caused by a driver's behavior based on driver's behavior pattern data associated with the gaze direction of the driver, and
increasing, by the controller, the frame rate of the side camera positioned in the predicted gaze direction of the driver.

16. The method of claim 15, wherein the predicting is based on at least one of turning of a steering device or flashing a turn indicator lamp.

17. The method of claim 11, wherein the adjusting further comprises:
predicting, by the controller, the gaze direction of the driver based on a left turn guidance, a right turn guidance, or a lane change guidance by a navigation system, and
increasing, by the controller, in advance the frame rate of the side camera positioned in the predicted gaze direction of the driver.

18. The method of claim 11, further comprising adjusting a screen brightness of the display based on the gaze direction of the driver.

* * * * *